(12) United States Patent
Noh et al.

(10) Patent No.: US 6,589,698 B1
(45) Date of Patent: Jul. 8, 2003

(54) ELECTROLYTE FOR RECHARGEABLE LITHIUM BATTERY

(75) Inventors: Hyung-Gon Noh, Seoul (KR); Sang-Won Lee, Chungcheongnam-do (KR); Eui-Hwan Song, Chungcheongnam-do (KR); Wan-Seog Oh, Chungcheongnam-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 17 days.

(21) Appl. No.: 09/689,152

(22) Filed: Oct. 11, 2000

(30) Foreign Application Priority Data

Oct. 12, 1999 (KR) ........................................ 1999-44153

(51) Int. Cl.[7] .............................................. H01M 6/16
(52) U.S. Cl. ....................... 429/340; 429/330; 429/332; 429/326
(58) Field of Search ................................ 429/340, 326, 429/330, 332

(56) References Cited

U.S. PATENT DOCUMENTS

| 4,489,145 A | 12/1984 | Abraham et al. | 429/197 |
| 5,686,138 A | 11/1997 | Fujimoto et al. | 429/197 |
| 6,232,020 B1 * | 5/2001 | Song et al. | 429/326 |

FOREIGN PATENT DOCUMENTS

| EP | 0878861 | 11/1998 |
| JP | 61147475 | 7/1986 |
| JP | 04206471 | 7/1992 |
| JP | 4-277469 | * 10/1992 |
| JP | 10 334944 | 12/1998 |
| JP | 2000-195546 | * 7/2000 |
| JP | 2000-340259 | 12/2000 |
| WO | WO99/28987 | 6/1999 |

OTHER PUBLICATIONS

Scanlon et al. "Ionic conductivity in THS/THF based electrolytes" Proc.—Electrochem. Soc., 93–8 (Proceedings of the Symposium on Batteries and Fuel cells for Stationary and Electric Vehicle Applications, 1993, pp. 36–43.*

Ein–Eli et al. "The use of S, S–dialkyl dithiocarbonates in Li–ion battery electrolytes", Journal of Solid State Electrochemistry, 1 (3), 1997, pp. 227–231.*

Yair, et al., "The use of S,S dialkyl dithiocarbonates in Li–ion battery electrolytes", XP–002158945, Electrochemical Society Proceedings, vol. 98–16, Proceedings of the Symposium on Lithium Batteries, Boston, MA, USA, Nov. 1998, 1999, Pennington, NJ, USA, Electrochem. Soc., USA.

Hamamoto, Shunichi et al., "Nonaqueous electrolyte for secondary lithium battery and its use in the battery", XP–002158944, Chemical Abstracts, abstract No. 107401, vol. 133, Columbus, Ohio, US.

* cited by examiner

*Primary Examiner*—Laura Weiner
(74) *Attorney, Agent, or Firm*—Christie, Parker & Hale, LLP

(57) ABSTRACT

Disclosed is an electrolyte for a rechargeable lithium battery including at least one organic solvent selected from the group consisting of thiocarbonate, thioester and thioether, and a lithium salt.

8 Claims, 1 Drawing Sheet

ELECTROLYTE FOR RECHARGEABLE LITHIUM BATTERY

CROSS REFERENCE TO RELATED APPLICATION

This application is based on application No. 99-44153 filed in the Korean Industrial Property Office on Oct. 12, 1999, the content of which is incorporated hereinto by reference.

BACKGROUND OF THE INVENTION (a) Field of the Invention

The present invention relates to an electrolyte for a rechargeable lithium battery and more particularly, to an electrolyte for a rechargeable lithium battery with good safety characteristics.

(b) Description of the Related Art

In recent years, the development of miniaturized portable electronics provokes needs for a rechargeable battery having a high capacity as well as a light weight. From the viewpoint of the capacity improvement per unit weight, the rechargeable lithium battery is preferably adopted because lithium has a high standard potential as well as a low electrochemical equivalent weight.

Safety characteristics are critical for rechargeable lithium batteries, and attempts to improve the safety characteristics have been made by modifying active materials, separators, battery systems or electrolytes. One approach has been to use a porous separator with a low melting point in the battery. The pores of the separator are easily blocked and lithium ions cannot pass through the pores. Another approach has been to design the battery to induce a short circuit when the internal pressure is raised due to gas generation.

Another approach is to use carbonate-based organic solvents in electrolytes. The carbonate-based organic solvents include cyclic carbonates such as ethylene carbonate and, propylene carbonate, linear carbonates such as dimethyl carbonate and, diethyl carbonate, and ethers such as tetrahydrofuran, ester and, ketone, or a mixture thereof. In particular, ethylene carbonate, propylene carbonate and ether are used.

However, the carbonate-based organic solvents have safety problems. The problems are caused by oxygen atoms in the carbonate-based organic solvents. During charge and discharge cycles, oxygen atoms are converted into oxygen gas or peroxide, resulting in an increase in internal pressure and possible explosion of the battery.

SUMMARY OF THE INVENTION

It is an object of the present invention to provide an electrolyte for a rechargeable lithium battery with good safety characteristics.

It is another object to provide the electrolyte for a rechargeable lithium battery that includes sulfur atoms.

These and other objects may be achieved by an electrolyte for a rechargeable lithium battery including at least one organic solvent and a lithium salt. The organic solvent is selected from thiocarbonate, thioester or thioether. The thiocarbonate, thioester or thioether is prepared by replacing oxygen atoms with sulfur atoms in carbonate, ester or ether, respectively.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE INVENTION

Figure 1:
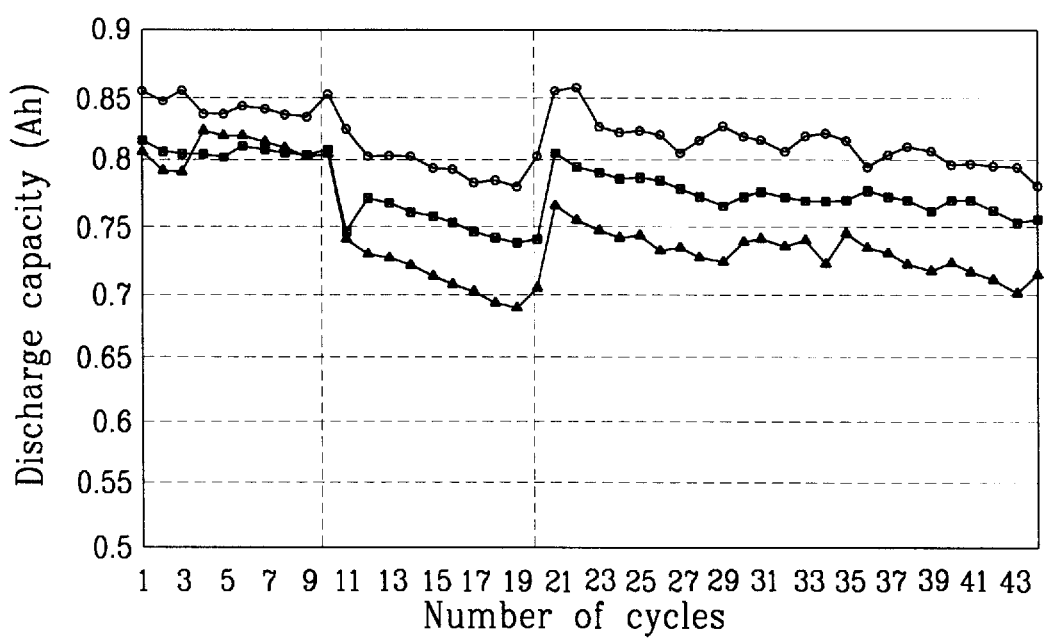
FIG. 1 is a graph illustrating cycle life of a rechargeable lithium battery with an electrolyte of the present invention.

The conventional electrolyte includes a carbonate-based organic solvent and a lithium salt. The carbonate-based organic solvent exhibits high conductivity in the presence of suitable lithium salts. However, the safety of these solvents has been questioned. Oxygen atoms in the carbonate-based organic solvent are converted into oxygen gas or peroxide, which are able to increase internal pressure and explode a rechargeable lithium battery.

An electrolyte of the present invention uses a sulfur-included organic solvent, and accordingly, the electrolyte of the present invention can prevent problems associated with oxygen atoms in organic solvents.

The sulfur-included organic solvent is selected from thiocarbonate, thioester or thioether, and it is produced by replacing oxygen atoms with sulfur atoms in carbonate, ester and ether.

The element sulfur belongs to 6B of the periodic table, as does oxygen. The sulfur atom has a larger atomic radius than that of the oxygen atom, and the larger atomic radius of the sulfur atom makes it easier to form a covalent bond between lone paired electrons of the sulfur atom and lithium ion relative to the oxygen atoms in dimethyl carbonate. This improves both the activation of lithium ions and ion conductivity.

Because the sulfur-included organic solvent includes no oxygen atoms, which can generate gas or peroxide and increase internal pressure of the battery, the electrolyte of the present invention can provide a rechargeable lithium battery exhibiting improved safety characteristics.

Preferred thiocarbonate is dimethyl trithiocarbonate represented by formula 1.

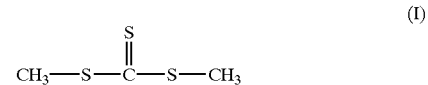

(I)

Trithiocarbonate of formula 1 has a melting point of $-3°$ C., a boiling point of $101°$ C. at 121 mmHg and a flash point (Fp) of $97°$ C. Dimethyl carbonate of the conventional electrolyte has a boiling point of $90.6°$ C. at ambient pressure. Accordingly, the boiling point of trithiocarbonate is higher than that of dimethyl carbonate and the high melting point makes it difficult to evaporate trithiocarbonate. Furthermore, it is difficult to generate oxygen gas or peroxide in the battery, so explosions can be prevented.

Preferred thioether is tetrahydrothiophene, which is produced by substituting sulfur atoms for oxygen atoms in tetrahydrofuran.

Furthermore, the electrolyte of the present invention further may include an oxygen-included organic solvent selected from carbonate, ester or ether as used in conventional electrolytes.

If the electrolyte including both the sulfur-included organic solvent and the oxygen-included organic solvent is used in the rechargeable lithium battery, the amount of the thiocarbonate in total organic solvent is preferably 10 to 30 V % of the total electrolyte.

The examples of the electrolyte of the present invention including the sulfur-included organic solvent and the oxygen-included organic solvent are a first mixture of dimethyl trithiocarbonate, ethylene carbonate and propylene carbonate; a second mixture of dimethyl trithiocarbonate, diethyl carbonate and ethylenemethylene carbonate; and a third mixture of dimethyl trithiocarbonate, dimethyl carbonate and diethyl carbonate.

The lithium salt may be any lithium salts known in the related arts, and the exemplary are $LiPF_6$, $LiAsF_6$, $LiCF_3SO_3$, $LiN(CF_3SO_2)_3$, $LiBF_6$, or $LiClO_4$.

The following examples further illustrate the present invention.

EXAMPLE 1

94 wt % of $LiCoO_2$ (Nippon chem., Co.) as a positive active material, 3 wt % of Super P as a conductive agent and 3 wt % of polyvinylidene fluoride as a binder were dissolved in N-methylpyrrolidone as a solvent to make a slurry. The slurry was then cast into a film shape on aluminum foil as a current collector to produce a positive electrode. 90 wt % of mesocarbon fiber (Petoca, Co.), 0.2 wt % of oxalic acid as an additives and 9.8 wt % of polyvinylidene fluoride were dissolved in N-methylpyrrolidone to make a slurry. The slurry was then cast into a film shape on a copper foil to produce a negative electrode.

Dimethyl trithiocabonate (Aldrich., Co.), ethylene carbonate and propylene carbonate were mixed in the volume ratio of 2:4:4. In the mixed organic solvent, 1M $LiPF_6$ was dissolved to produce an electrolyte.

The positive electrode was assembled with the negative electrode and a separator (Celgard., Co.) to produce an electrode element. The electrolyte was added to the electrode element to fabricate a rechargeable lithium cell.

EXAMPLE 2

A rechargeable lithium cell was manufactured by the same procedure in Example 1 except that dimethyl trithiocarbonate, diethyl carbonate, and ethylene methylene carbonate were mixed in the volume ratio of 2:4:4.

EXAMPLE 3

A rechargeable lithium cell was manufactured by the same procedure in Example 1 except that dimethyl trithiocarboante, dimethyl carbonate, and diethyl carbonate were mixed in the volume ratio of 2:4:4.

Charge Cycle Life Characteristics Test

The cycle life characteristics of the cells according to Examples 1 to 3 were measured. At this time, the charge and discharge cycles were repeated three times at 0.5C, 10 times at 1C, and 24 times at 0.5C. The results are shown in FIG. 1. In FIG. 1, the ♦ line indicates the cell of Example 1 (hereinafter, referred to as "(a)"), the ☐ line indicates the cell of Example 2 (hereinafter, referred to as "(b)") and the ▲ line indicates the cell of Example 3 (hereinafter, referred to as "(c)').

After repeating the charge and discharge cycles at 0.5C 10 times, all of (a), (b) and (c) exhibited no capacity loss. Furthermore, after repeating the charge and discharge cycles at 1C 10 times, the capacity of (a) was reduced from 0.85 Ah to 0.80 Ah, that of (b) was reduced from about 0.8 Ah to about 0.75 Ah and that of (c) was reduced from 0.75 Ah to 0.70 Ah. That is, the capacity loss was about 0.05 Ah for each, or about 6.0 to 6.7%. Accordingly, the cells of Examples 1 to 3 exhibited good cycle life characteristics. In addition, after repeating the charge and discharge cycles at 0.5C 24 times, the capacity loss was the same as that at 1C for 10 times. It is therefore shown that the sulfur-included organic solvent serves to improve the cycle life characteristics.

Furthermore, the sulfur-included organic solvent serves to facilitate the movement of lithium ions and to improve ion conductivity, and has a higher boiling point than carbonate-based organic solvent such that it is difficult to evaporate, and it generates no oxygen gas or peroxide. Accordingly, the electrolyte of the present invention can provide a rechargeable lithium battery with good safety characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a rechargeable lithium battery comprising:

at least one organic solvent selected from the group consisting of thioesters and thioethers other than tetrahydrothiophene; and a lithium salt.

2. The electrolyte of claim 1 further comprising at least one additional organic solvent selected from the group consisting of carbonates, esters and ethers.

3. An electrolyte for a rechargeable lithium battery comprising:

an organic solvent consisting essentially of tetrahydrothiophene; and a lithium salt.

4. An electrolyte for a rechargeable lithium battery comprising dimethyl trithiocarbonate and a lithium salt.

5. The electrolyte of claim 4 further comprising at least one additional organic solvent selected from the group consisting of carbonates, esters and ethers.

6. The electrolyte of claim 5 wherein the electrolyte includes dimethyl trithiocarbonate, ethylene carbonate and propylene carbonate.

7. The electrolyte of claim 5 wherein the electrolyte includes dimethyl trithiocarbonate, diethyl carbonate and ethylenemethylene carbonate.

8. The electrolyte of claim 5 wherein the electrolyte includes dimethyl trithiocarbonate, dimethyl carbonate and diethyl carbonate.

* * * * *